United States Patent [19]

Jotwani

[11] Patent Number: 4,621,358
[45] Date of Patent: Nov. 4, 1986

[54] REMOTE SWITCH FOR TELEPHONY SWITCHING SYSTEM

[75] Inventor: Haresh Jotwani, Longwood, Fla.

[73] Assignee: Stromberg-Carlson Corporation, Lake Mary, Fla.

[21] Appl. No.: 680,005

[22] Filed: Dec. 10, 1984

[51] Int. Cl.$^4$ ............................................. H04Q 11/04
[52] U.S. Cl. ......................................... 370/56; 370/58; 370/68.1; 379/282
[58] Field of Search ......................... 370/58, 110.1, 56; 179/18 ES

[56] References Cited

U.S. PATENT DOCUMENTS

| | | | |
|---|---|---|---|
| 4,007,338 | 2/1977 | McLaughlin | 370/56 |
| 4,393,495 | 7/1983 | Cray et al. | 370/110.1 |
| 4,479,034 | 10/1984 | Brightman et al. | 179/18 ES |
| 4,523,308 | 6/1985 | Bull et al. | 370/58 |
| 4,573,151 | 2/1986 | Jotwani | 370/58 |

Primary Examiner—Douglas W. Olms
Assistant Examiner—Kenneth I. Rokoff
Attorney, Agent, or Firm—Cesari and McKenna

[57] ABSTRACT

A telephone switching network including a remote line switch that couples digital voice signals from a plurality of subscriber lines onto a lesser number of communications links connected to a central office. The remote line switch also includes an intra-nodal switch that switches telephone calls between subscriber lines connected thereto, so that the digital voice signals for the calls need not be transmitted to the central office for switching. The line switch, on receiving a request from the central office for a termination connection to a called line, determines whether both the calling and called lines are connected to it. If they are, and if the line's classes of service as supplied by the central office permit, the line switch establishes a path through its intra-nodal switch to switch the call.

12 Claims, 25 Drawing Figures

FIG. 3

LGH RAM 54

| TS | ADRS | B1 | B0 | LGH # |
|------|------|----|----|-------|
| TS0  | 0    |    |    |       |
| TS1  | 1    |    |    |       |
| TS2  | 2    |    |    |       |
| TS30 | 30   |    |    |       |
| TS31 | 31   |    |    |       |

FIG. 4

TSI RAM 60

| TS | ADRS | TSI # |
|------|------|-------|
| TS0  | 0    |       |
| TS1  | 1    |       |
| TS2  | 2    |       |
| TS30 | 30   |       |
| TS31 | 31   |       |

FIG. 5

PGHI RAM 61

| TS | ADRS | PGHI SEL | SOURCE SEL |
|------|------|----------|------------|
| TS0  | 0    |          |            |
| TS1  | 1    |          |            |
| TS2  | 2    |          |            |
| TS30 | 30   |          |            |
| TS31 | 31   |          |            |

FIG. 7

|   |   | 7 | | | 0 | |
|---|---|---|---|---|---|---|
| 1) | LGH ASSMT | B1 | B0 | | LGH # | ⎫ |
| 2) | TSI ASSMT | MASK M1 | MASK M2 | | TSI # | ⎬ R/W |
| 3) | PGHI ASSMT | PGHI IDLE | PGHI # | | SOURCE SELECT | |
| 4) | COMMAND | DONE | FORCE M2 | FORCE M1 | COMMANDS | ⎭ |
| 5) | LGH STATUS | B1 | B0 | | LGH # | ⎫ |
| 6) | TSI STATUS | | | | TSI # | |
| 7) | PGHI STATUS | | PGHI # | | SOURCE SELECT | ⎬ R |
| 8) | M1 STATUS | | PGHI # | | TSI # | |
| 9) | M2 STATUS | | PGHI # | | TSI # | ⎭ |

COMMANDS

| | | |
|---|---|---|
| 0 | : | NOP |
| 1 | : | WRITE REGS 1 AND 3 |
| 2 | : | WRITE REG 1 |
| 3 | : | WRITE REGS 1, 2 AND 3 |
| 4 | : | CLEAR M1 AND M2 INTERRUPTS |
| 5 | : | READ REGS 5, 6 AND 7 |

MESSAGE FORMAT

CONNECT

TERMINATE
INS REQUEST
INS COMPLETE
INS CONNECT
BUSY VERIFY

FIG. 8D

INS FAIL

| CALLED |
| --- |
| EQ NO |
| REASON |

FIG. 8E

ALL PATHS BUSY (APB)
(CONNECT FAIL)

| CALLED |
| --- |
| EQ NO |
| CALLING |
| EQ NO |
| APB CODE |

FIG. 8F

LGM PATH ASSIGN
LGM PATH ASSIGNED
LGM PATH RELEASE

| LINE CARD NO | |
| --- | --- |
| | TIME SLOT |

INTRANODAL CALL SET-UP

BUSY VERIFY

FIG. 11A-1
INTRANODAL CALL RELEASE

```
CP                    LSC                       LGC

LGC MONITORS LINE FOR SHIFT
                                     TO ON-HOOK STATUS. WHEN
                                     LINE GOES ON-HOOK, SENDS
                                     ON-HOOK MESSAGE TO LSC
                                           :
                    ------------------------
                    :
                    V
            DETERMINE WHETHER CALLING
        -   OR CALLED LINE WENT ON HOOK
        :           :
        :           : CALLED
        :           V
        :         +---+
        :         : A :    FIG. 11B-1
        : CALLING +---+
        :----------
                    :
                    V
            RELEASE INS PATH
                    :
                    V
            SEND RELEASE MESSAGE
            TO CP IDENTIFYING
            THE RELEASED CALLING LINE
                    :
      ----------------
      :             :
      V             :
RECORD RELEASE EVENT :
FOR USAGE MONITORING :
                    V
            SEND RELEASE MESSAGE TO
            LGC OF LINE GROUP OF CALLING LINE
                    :
                    :--------------------
                    :                   :
                    :                   V
                    : RELEASE LGH PATH FOR CALLING LINE
                    V
            TEST CALL BUFFER OF CALLED LINE
            TO DETERMINE IF IT HAS ALSO RELEASED - YES
                    :                              :
                    : NO                           :
                    V                              :
            SET TIMEOUT RELEASE FOR CALLED LINE    :
                    :                              :
                    V                              :
                  +---+                            :
                  : B :   FIG. 11C                 :
                  +---+                            :
                  +---+ <--------------------------:
                  : C :   FIG. 11A-2
                  +---+
```

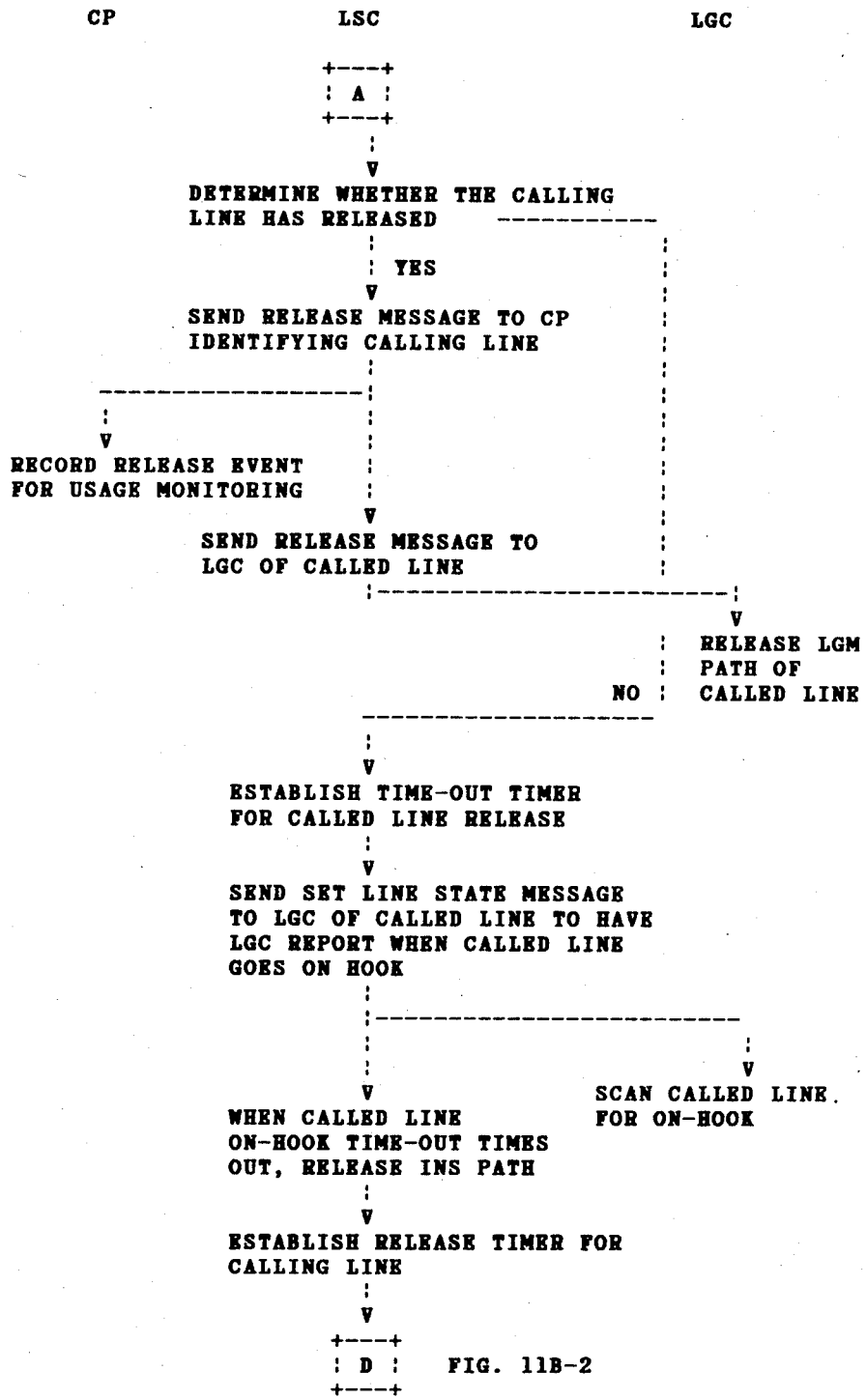

REMOTE SWITCH FOR TELEPHONY SWITCHING SYSTEM

BACKGROUND OF THE INVENTION

This invention generally relates to the field of telephony networks, and, more specifically, to a telephony network that incorporates a switch unit remote from the central office.

DESCRIPTION OF THE PRIOR ART

U.S. patent application Ser. No. 507,935, filed June 23, 1983, discloses a telephony network that includes a digital central office that performs switching operations. In that network, telephone lines connected to subscriber sets and trunk circuits from other central offices connect directly to a digital central office through a plurality of line and trunk circuits in port group units. Each connection is made through conventional tip-and-ring or similar conductors that extend from each individual subscriber or remote central office to the location of the digital central office. These conductors carry signals in analog form that represent voice data or other user information, herein generally referred to as voice information, and supervisory information. The supervisory information may be "sense supervisory" information, including hook status and dial pulse information which the central office receives from the subscriber line, or "control supervisory" information, which includes ringing and other control signals that are sent by the supervisory information to the subscriber line, or that cause certain operations to be performed on the subscriber telephone.

Each port group unit in the central office described in the aforementioned U.S. patent application Ser. No. 507,935 connects directly to a plurality of telephone subscriber lines through individual port circuits, such as line or trunk circuits. Each port circuit converts incoming analog voice signals to digital form, and the digital signals are transferred in a serial digital pulse train and multiplexed onto a port group highway with other digital voice signals from port circuits connected to other subscriber lines. Sense supervisory information, in digital form, is also multiplexed onto this pulse train. A time-slot interchange (TSI) matrix switch network receives the pulse train, strips the incoming sense supervisory information and stores it in an area of a port data store that is assigned to each port circuit. A port event processor samples information stored in each port's data store area, processes the information, and generates messages in response thereto which are sent to a call-control processor. The call control processor responds to these messages by transmitting commands and other information to the corresponding areas of the port data store, which enable the port event processor to control the corresponding telephone subscriber line. The call control processor also transmits information to the TSI matrix switch network to establish a switching channel through the network which comprises a path for the digitized voice signals between the calling telephone subscriber line and the called subscriber line.

Commands to the port event processor from the call control processor enable the transmission of a dial tone signal, termination of a dial tone signal, or the transmission of ringing signals to the respective calling and called subscriber lines. The port event processor generates control supervisory information in response to these commands. The control supervisory information is multiplexed with the voice information in digital form and transmitted to the port group unit connected to the appropriate calling or called subscriber line and the port group unit performs the functions required by the control supervisory information. The port group unit also receives a multiplexed digital voice signal stream, demultiplexes the stream and directs the digital voice signals to the line circuits for the appropriate subscriber lines. Each port circuit receives the digital voice signals and converts them to analog form for transmission over the connected subscriber line.

Telephony networks of this type require individual telephone subscriber lines from each subscriber location to the location of the digital central office. This approach works well and is economical where the subscribers either are located in a relatively small geographical area around the central office, or are randomly but widely dispersed around a central office. However, it often occurs that telephone subscribers are located in clusters which are geographically remote from the central office. For example, subscribers may live in small towns, in a rural setting, or in apartment buildings, in an urban setting. In such settings, with the system described in application Ser. No. 507,935, a separate line must be strung from the central office to each remote subscriber's location. Such a line normally includes not only cabling, but also amplification devices. The expense of the lines is readily apparent, especially in view of the fact that in many situations the call traffic volume in such remote locations, as a percentage of the maximum traffic capacity which the line could carry, is normally very low. Thus, the actual utilization of the telephone lines can become quite expensive and inefficient.

Two approaches to reducing the amount of cabling between the remote locations and the central office are disclosed in U.S. Pat. No. 4,393,495 issued to Edgar R. Cray, et al, on July 12, 1983, and in U.S. patent application Ser. No. 427,513, filed Sept. 29, 1982, both of which are assigned to the assignee of the present application. Both of these describe arrangements in which remote port units are placed at the center of clusters of subscribers. The remote port units concentrate calls over the lines onto a reduced number of communications links between the clusters and the central office. In both arrangements, both sense and control supervisory information is also transmitted over the same communications links which carry the voice signals, and, accordingly, no additional cabling is needed to enable the central office to control the remote port units.

In both remote port arrangements, all voice signals from the subscriber lines connected to the remote port unit are transmitted to the central office for switching, even if the calling and called ports are connected to the same remote port unit. Providing a remote switch in the remote port unit would allow calls between subscriber lines connected to the same remote port to be switched at the remote port unit and free communications channels over the communications link for other calls between subscribers not connected to the same remote port unit, thereby enhancing the call-carrying capacity of the remote port unit. Furthermore, the provision of switching capability in the remote port unit would permit switching of at least calls from lines connected to the same remote port unit should the communications links between the remote port unit and the central office be down in an emergency situation.

SUMMARY OF THE INVENTION

The invention aims to provide a remote port for a telephony switching system which has a remote switch for switching telephone calls for subscriber lines attached to a remote port unit.

In accordance with the invention, a remote port unit includes a resident switch. When the remote port unit receives a message from the central office requiring it to establish a termination path from the central office to a called subscriber line, it examines the message to determine if both the calling and called lines are connected to it. If they are, the remote port unit establishes a path from the called line to the communications link connected to the central office, as required by the message, and also establishes a path from the calling line to the called line through the resident switch. After the called line goes off hook, the remote port unit switches the call through the resident switch and so informs the central office, thereby allowing the central office to release the path through its switch for the call.

The invention allows a reduction in the number of communications links between the remote port and the central office required to achieve a desired call-carrying capacity, since the resident switch will carry some of the calls. Furthermore, during an emergency if the communications links between the remote port unit and the central office are down, the remote port unit can switch calls at least for the subscriber lines connected to it.

BRIEF DESCRIPTION OF THE DRAWINGS

This invention is pointed out with particularity in the appended claims. The above and further objects and advantages of this invention may be better understood by referring to the following detailed description taken in conjunction with the accompanying drawings, in which:

FIGS. 3, 4 and 5 depict memory maps of three memories used in the switching module depicted in FIG. 2;

FIG. 7 is a diagram outlining the details of various registers and commands which the remote port uses to control the resident switch.

FIGS. 8A through 8F detail the structure of messages between the central office and the remote port; and FIGS. 9A through 11C contain flow diagrams which are useful in an understanding of the invention.

DESCRIPTION OF AN ILLUSTRATIVE EMBODIMENT

A. Telephony Network

Figure 1:
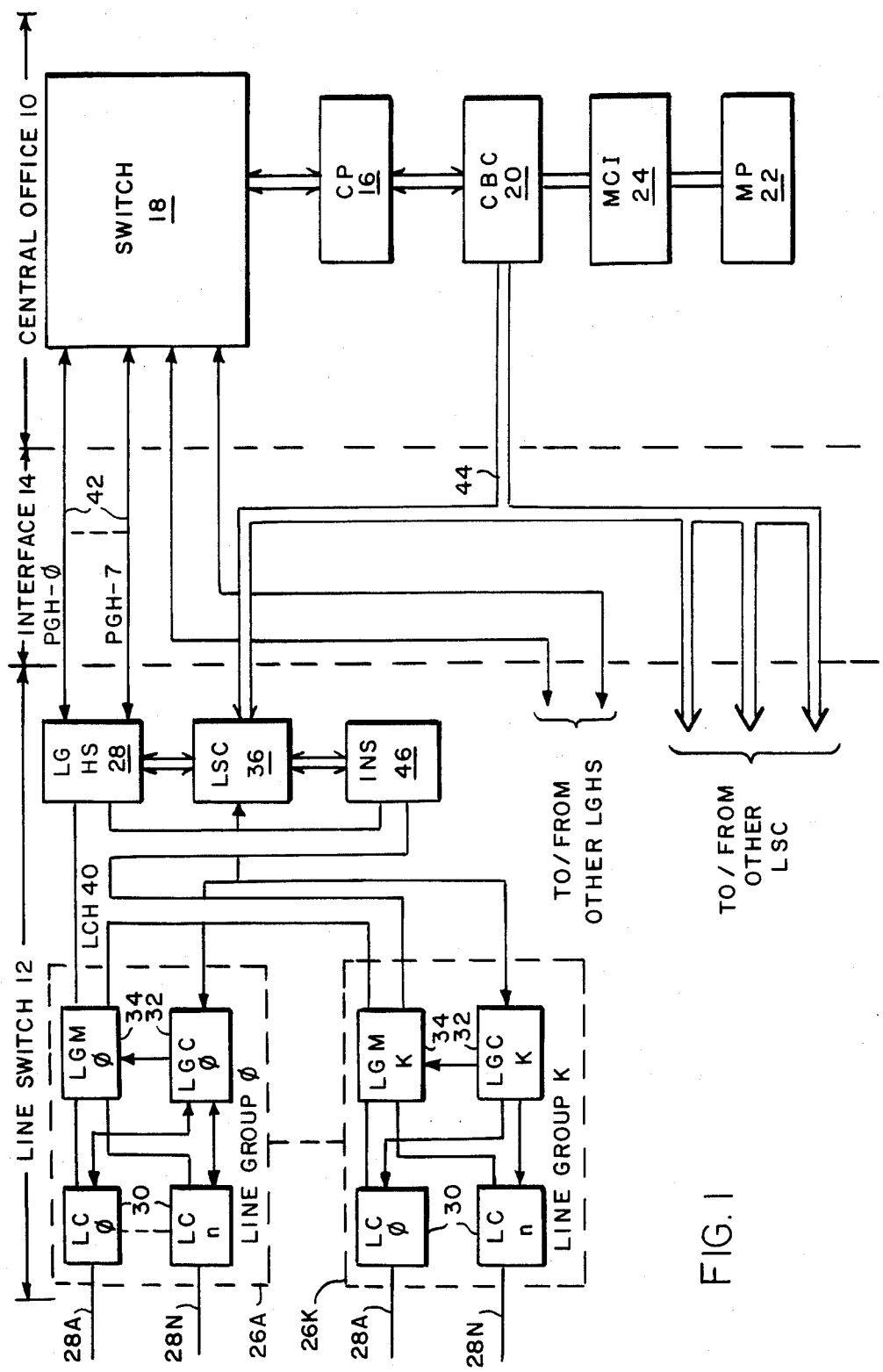
FIG. 1 is a block diagram of a telephony network which includes a remote port unit constructed in accordance with this invention.

FIG. 1 depicts a telephony network system that includes a central office 10 connected to one or more line switches generally indicated by reference numeral 12 through an interface 14. The central office 10 may be as depicted in U.S. patent application Ser. No. 507,935, filed June 23, 1983. A call control processor 16 controls the call processing operations of the system. A time slot interchange matrix switch network 18, under control of call control processor 16, performs line and trunk switching operations through central office 10. The call control processor 16 also transmits and receives control and sense supervisory information with the rest of the system through, for example, a communications buffer controller 20.

As is common in telephony systems, certain elements of the system may be duplicated or redundant so that if one element fails, the redundant element may take over. A maintenance processor 22, which connects to the rest of the central office through a maintenance communications interface 24, performs maintenance and diagnostic operations on the system and detects when one of the elements fails. The maintenance processor can cause the redundant element to substitute for a failed element, in some instances may take certain corrective action, and will also provide certain diagnostic information to a maintenance repairman.

The line switch 12 includes a plurality of line groups 26A through 26K, each of which connects to a plurality of subscriber lines 28A through 28N. Each line group 26A–26K may connect to a selected number of subscriber lines 28A–28N. In one specific embodiment, a maximum of ninety subscriber lines may be connected to one line group, and a maximum of twelve line groups can be connected to a line card 30 which converts the analog voice signal to a digital pulse code modulated (PCM) signal for transmission to the rest of the telephony system, and converts the digital PCM signal received from the telephony system into an analog signal for transmission to the subscriber line. Line card 30 also detects when a subscriber's receiver goes on and off hook, and sends signals representative of these events to a line group controller 32. The digitized voice information is transferred directly to and from a line group multiplexer 34, which is under control of the line group controller 32.

The line group controller transfers messages to a line switch controller 36 informing it of the on- and off-hook condition of the lines, and receives messages from the line switch controller 36 which, for example, cause the line group multiplexer 34 to establish or release paths for lines that have gone off- or on-hook. The line switch controller 36 also generates and transmits messages to the call control processor 16 in central office 10 over interface 14 and through communications buffer controller 20, in response to the messages from the line group controllers 32. The line switch controller 36 also receives messages from the call control processor 16 over interface 14, and through communications buffer controller 20, and in turn may generate other messages in response thereto for transmission to the line group controllers 32 to cause certain actions, such as ringing, to occur on the subscriber lines.

In addition, the line switch controller 36 controls a line group highway switch 38 which receives the digitized voice information signals in specified time slot channels from the line group multiplexers 34 over line group highways 40 connected to the line group multiplexers, and transfers them over a "send" path to specified port group highways 42 for transfer to the time slot interchange matrix switch network 18 at the central office 10. The line group highway switch 38 also receives the digitized voice information signals from the time slot interchange matrix switch network 18, specifically from port group highways 42, and distributes them over a "receive" path to the respective line group multiplexers 34 over line group highways 40.

Central office 10 may be connected to a plurality of line switches 12 through interface 14. The interface includes one or more port group highways 42 which carry the digitized voice information signals between the line group highway switch in each line switch and the central office. The connection of each port group highway to the central office 10 is generally described in the above-referenced U.S. patent application Ser. No. 507,935. In addition, the interface 14 includes a control path 44 over which the line switch controller 36 in the line switch communicates with the call control processor 16 and the maintenance processor 22, by way of communications buffer controller 20 and, in the instance of maintenance processor 22, maintenance communications interface 24, at the central office 10.

The actual manner in which the communication signals are transferred over control path 44 is not an element of this invention, and will not be described in detail. In one specific embodiment, the control path makes use of a SDLC (synchronous data loop control) protocol, which is well known in the art, for such communications. In that embodiment, the call control processor 16 and maintenance communication interface 24 send messages to the communications buffer controller 20, which acts as a loop master in the SDLC system, with the line switch controllers in the various connected line switches being slave units in the loop. The communications buffer controller formulates the messages into the SDLC protocol for transmission to the line switch controllers, and receives messages from the line switch controllers in response to loop polls. In that same embodiment, the line group controllers 32 in each line switch 12 are also SLDC (synchronous data link controller) slaves in a loop controlled by the line switch controller 36.

A line switch may be co-located with the central office, or it may be remote from the central office. For the line switches that are remote from the central office, the port group highways 42 may be constituted by a conventional T1 spans, in which supervisory information is multiplexed with the digitized voice information and transferred over the same lines. The SDLC (synchronous data link controller) signals can also be multiplexed onto the T1 spans in selected channels of the T1 spans that have heretofore normally been allocated to digitized voice information signals.

In one specific embodiment, each line group 26a–26k is connected to three line group highways 40; therefore, line group highway switch 38 is connected to a maximum of thirty-six line group highways. A maximum of eight port group highways 42 connects the line switch 12 to central office 10. Each line group highway and each port group highway has a maximum capacity of thirty-two time slot channels, with thirty channels transferring digital voice information signals and the other two channels transferring port control information signals. For the line switches 12 remote from the central office, in which the port group highways are constituted by T1 spans, twenty-four time slot channels are available, which transfer either digitized voice information signals, with A and B supervisory bits transferring supervisory information or messages as described above. Since communication over the T1 spans is limited to twenty-four channels, the line group highways in the line switches connected to the T1 spans are also limited to using twenty-four time slot channels each.

In accordance with the invention, the line switch 12 includes a remote intra-nodal switch 46 which receives voice signals from line group highways 40 and, under control of the line switch controller 36, switches the voice signals to allow switching between calling and called subscriber lines connected to the same line switch. This frees up time slots over the port group highways 42, thereby facilitating a reduction in the number of port group highways required to maintain a selected traffic level through the line switch. Furthermore, it is apparent that, if the switch 46 includes digits receiving and decoding circuitry such as tone dial receivers for DTMF decoding, the line switch can, in an emergency situation, switch calls even if all of the port group highways 42 are down in an emergency situation.

B. Intra-nodal switch 46

Figure 2:
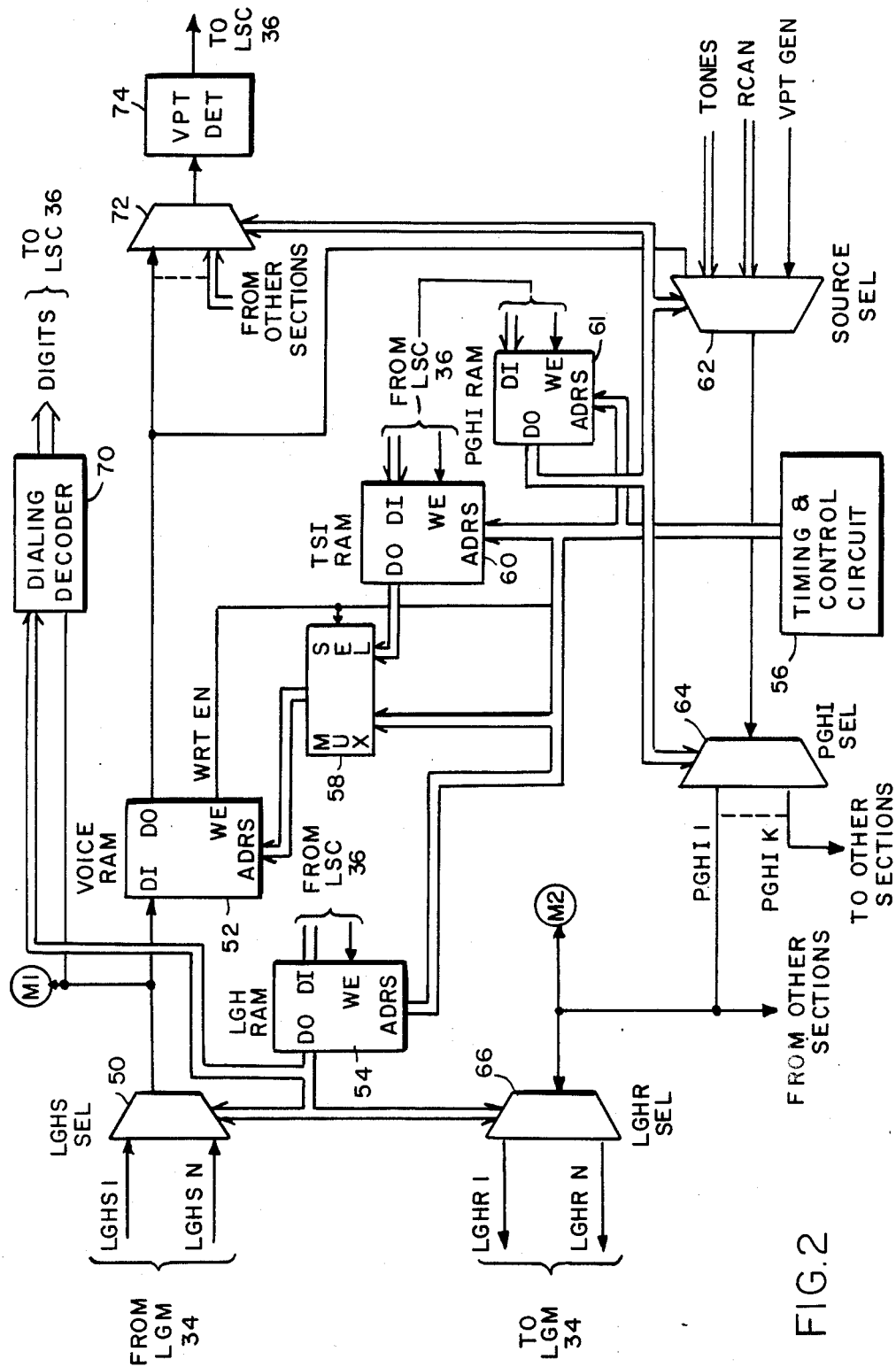
FIG. 2 is a block diagram of a switching module used in the remote port unit depicted in FIG. 1.

FIG. 2 depicts a detailed block diagram of one section of the intra-nodal switch 46. In one specific embodiment, the intra-nodal switch comprises eight sections as depicted in FIG. 2 and interconnected as explained below.

With reference to FIG. 2, the digitized voice signals from the line group highway 40 (FIG. 1) are received over line group highway "send" lines LGHS1–LGHSN in a line group highway "send" (LGHS) selector 50. In each time slot, the serial digitized voice signals from one of the line group highway "send" lines LGHS1 through LGHSN are coupled to the data input terminal of a voice random access memory (RAM) 52. The LGHS selector 50 is controlled by a line group highway (LGH) RAM 54 under control of a timing and control circuit 56 which transmits timing signals identifying the sequential time slots. Each digitized voice signal is stored in the RAM 52 in a location identified by an address signal from a multiplexer 58, which couples a WRITE address from timing and control circuit 56 to the address input terminals of the memory 52. The voice RAM 52 includes a storage location for each time slot, and the digital voice signals from LGHS selector 50 are coupled into sequentially addressed locations of the memory 52 associated with the time slots as identified by the timing and control circuits 56. The timing and control circuit transmits a WRT EN write enabling signal to control the multiplexer 58 and the storage of data in voice RAM 52.

Between sequential WRITE operations, the stored digital voice signals from one time slot are transmitted from voice RAM 52 from addresses identified by a TSI RAM memory 60. Thus, the digitized voice signals from LGHS selector 50 stored during one time slot are transmitted from the voice RAM 52 in another time slot as selected by memory 60. The data output (DO) terminal of voice RAM 52, through which the digital voice signals are transmitted, is connected to a source select concentrator 62, which couples either the digital voice signals or one of the plurality of tones, recorded announcements (RCAN), or VPT signals from a voice pattern test generator (not shown), or the like, in digital form, in a conventional manner. All of these signals are collectively identified as digital voice signals herein. The output of the source select concentrator 62 is then coupled to a PGHI (port group highway internal) selector 64 which operates as a deconcentrator or demultiplexer to couple the output signal from source select concentrator 62 onto one of a plurality of internal port group highways PGHI1 through PGHIk, as selected by the output of a PGHI RAM 61.

One of the output lines from PGHI selector 64 is connected to the input of an LGHR (line group highway receive) selector 66, which, under control of the line group highway RAM 54, couples the digital voice signals onto a selected one of the line group highway receive lines for transmission to the appropriate line card 30 (FIG. 1) through a line group multiplexer 34. The input of each LGHR selector 66 in the various sections of the switch 46 is connected to one output terminal of each of the PGHI selectors 64 in all of the sections in a wired "or" configuration. Thus, selector 66 in one section may, in differing time slots, receive digital voice signals from selectors 64 in various sections of switch 46.

The output terminal of LGHS selector 50 is also connected to a dialing decoder circuit 70 which, under control of control signals from line group highway RAM 54, receives the voice data signals. When activated by the signals from line group highway RAM 54, the signals coupled to the dialing decoders comprising DTMF signals. The dialing decoder circuit 70 determines the DTMF digits being dialed and transmits the identity of the dialed digits to the line switch controller 36.

As has been mentioned, one of the voice data signals which may be selected by source select concentrator 62 is the output of a voice pattern test generator. The output of voice RAM 52 may also be coupled through a multiplexer or concentrator 72, which also receives corresponding signals from the other sections of switch 46 (not shown), and couples one selected signal to a voice pattern test detector circuit 74.

As has been noted above, one specific embodiment of line switch 12 has a redundant intra-nodal switch 46 which may be used in the event that the other circuit is faulty. In that embodiment, the corresponding sections both perform the identical operations, but the output of the line group highway "receive" selector 66 in only one of the circuits is transmitted to the line group multiplexers 34 (FIG. 1). The output signals of elements in corresponding sections of the redundant switches are tested at two points which are noted in FIG. 2 as M1 and M2. The tests at these points ensure that the signals at the points in the two redundant sections correspond with one another. In that embodiment, the corresponding M1 and M2 test points in the redundant sections are connected to exclusive OR gates and if the signals at the points in the sections differ, an alarm signal will be transmitted to the line switch controller 36 allowing it to take corrective action.

As is evident from FIG. 2, the section of the intra-nodal switch 46 depicted in FIG. 2 is controlled by the contents of line group highway RAM 54, time slot interchange RAM 60, internal port group highway RAM 61, and the output of timing and control circuit 56 which identifies the successive time slot channels received over the line group highway "send" lines from line group multiplexers 34 and transmitted over the line group highway "receive" lines to line group multiplexers 34. The memory map of line group highway RAM 54 is depicted in FIG. 3. RAM 54 includes an addressable storage location for each of the thirty-two time-slot channels (thirty channels for digital voice signals and two for control or sense supervisory information). The low order portion of the word in each location stores a line group highway identification number. The high order portion of each word comprise B0 and B1 signals which control, for example, the dialing decoder 70. In response to control signals from the timing and control circuit 56, which cause the RAM to sequentially step through the addresses from the first location (address "0") to the thirty-second location (address "31"), a line group highway number is transmitted which causes the digital voice signal from the identified one of LGHS1 through LGHSn to be coupled through LGHS selector 50. Depending on the conditions of the B1 and B0 signals, dialing decoders circuit 70 may receive the digital voice signals as dial pulse or DTMF signals and decode them to identify the dialed digits. In addition to controlling the LGHS selector 50, the contents of the line group highway number field in each word control the LGHR selector 66 in each time slot.

With reference to FIG. 4, the TSI RAM 60 includes one addressable location associated with each sequential time slot, with the first location (address "0") address being associated with time slot "0", and so forth. The contents of each location in TSI RAM 60 identifies the location in voice RAM 52 the contents of which are to be transmitted during each time slot as identified by timing and control circuit 56. Thus, if digital voice signals are loaded into the K-th location in voice RAM 52, and if the contents of the L-th location in TSI RAM 60 identify time slot No. K, then during the L-th time slot, as identified by timing and control circuit 56, voice RAM 52 transmits its contents of the K-th location through the data output terminal. RAM 52 will be transmitted.

With reference to FIG. 5, the internal port group highway RAM 61 also includes a plurality of storage locations each associated with one time slot identified by timing and control circuit 56. Each storage location includes a high order field the contents of which control the PGHI selector 64 and a low order field the contents of which control the source selector 62. Thus, during each time slot the PGHI RAM 61 source select field determines whether voice data or one of a plurality of tones, recorded announcements, or the output of the voice pattern test generator (not shown) is coupled through source selector 62. Similarly, during each time slot, the high order field selects the internal port group highway PGHI 1 through PGHI k over which the output of source selector 62 is transmitted.

Figure 6:
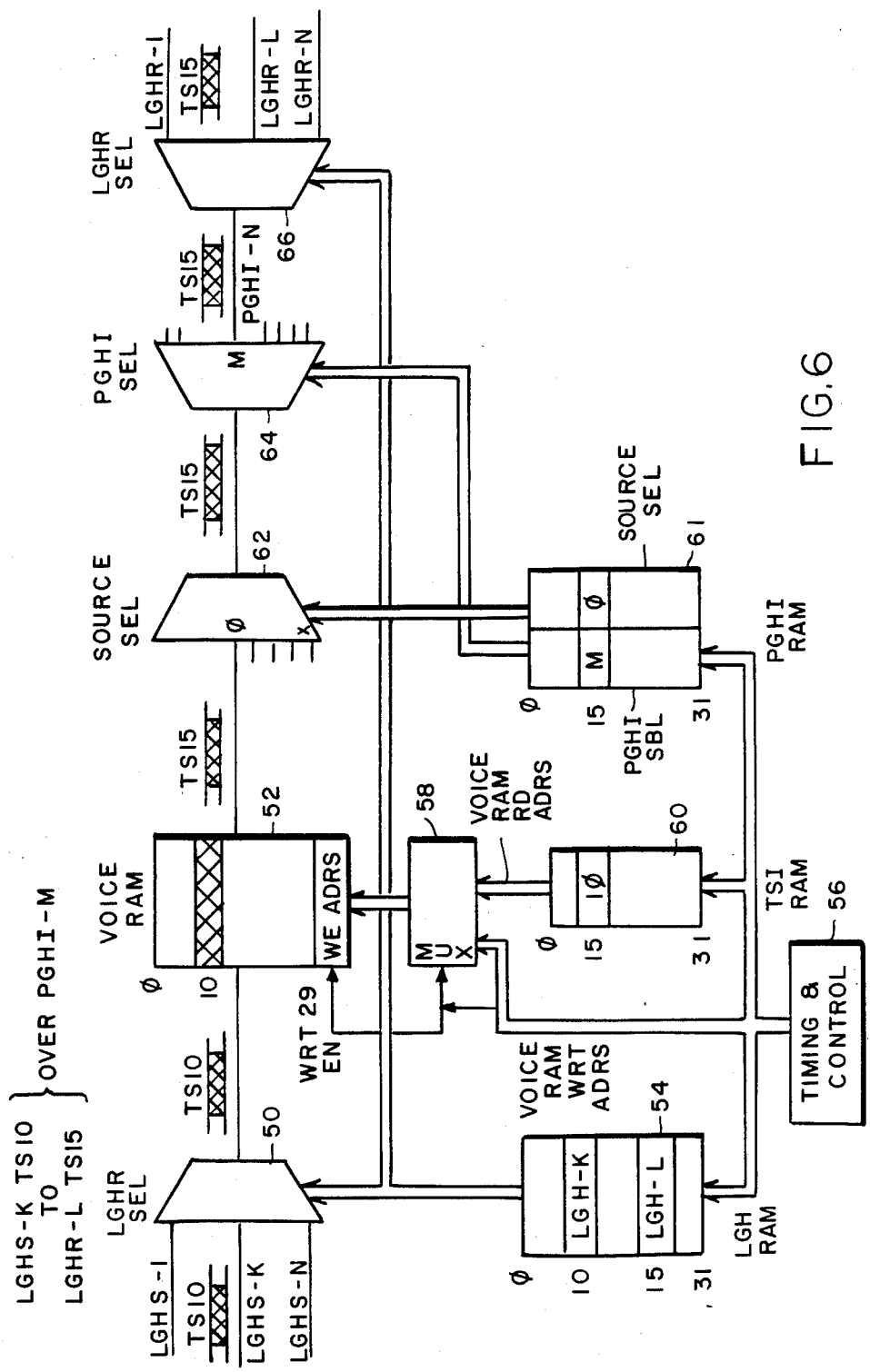
FIG. 6 is a diagram useful in understanding the operation of the switching module depicted in FIG. 2.

A specific example of the operation of the intra-nodal switch 46 will now be presented in connection with FIG. 6. In that example, a particular digital voice signal received by the switch 46 from a line group multiplexer 34 over line group highway "send" line LGHS-K in time slot TS10 will be switched to line group highway "receive" line LGHR-L in time slot TS15 over the internal port group highway PGHI-M. With reference to FIGS. 2 and 6, during the tenth time slot TS10, as identified by timing and control circuit 56, the contents of storage location 10 of LGH RAM 54 are transmitted to the control input terminal of LGH line group highway "send" selector 50. The digital voice signal, which is graphically represented by the cross-hatching, on LGHS-K in time slot 10 is coupled through the LGHS selector 50 to the data input terminal of voice RAM 52. During the first portion of the time comprising time slot 10, the WRT EN write enable signal from timing and control circuit 56 enables the multiplexer 58 to couple the output signals from timing and control circuit 56, which have the value "10" to identify time slot TS10, to the address terminal of voice RAM 52. The WRT EN write enable signal also enables the digital voice signal to be stored in storage location 10, as shown by the cross-hatching in that storage location in the voice RAM 52.

During the time slot TS15, the TSI RAM 60 transmits the contents of storage location 15 to multiplexer 58, which couples them to the address terminal of voice RAM 52 in response to the negated WRT EN write enable signal during the second half of the time slot period. The contents of the addressed location in the voice RAM, which comprise the digital voice signal identified by the cross-hatching, are then transmitted from the data output terminal during time slot 15.

The contents of the corresponding location in PGHI internal port group highway RAM 61 are transmitted during the same time slot. The source select field of this location conditions the source select concentrator 62 to couple the digital voice signal to the PGHI selector 64. The PGHI select field of the same addressed location in PGHI RAM conditions PGHI selector 64 to couple the voice data onto the internal port group highway PGHI-M. The digital voice signal is then coupled to the input terminal of the LGHR selector 66 of the section of intranodal switch 46 which is connected to PGHI-M. During the same time slot, the LGH RAM 54 in that section of the switch transmits the contents of storage location 15, namely "LGH-L" which conditions the line group highway "receive" selector 66 to transmit the input onto the line group highway "receive" path LGHR-L to the connected line group multiplexer 34.

It should be noted also that during the tenth time slot, the contents of the tenth storage location of LGH RAM 54 are also transmitted to the LGHR selector 66 and during time slot 15, the contents of the 15th storage location of LGH RAM 54 are also coupled to LGHS selector 50. Thus, a two-way path can be established through the same set of elements 50, 52, 62, 64, and 66 if the contents of the respective storage locations in TSI RAM 60 and PGHI RAM 61 in the various sections of intra-nodal switch 46 are programmed accordingly.

C. Control of the Intra-nodal Switch

As has been noted, the intra-nodal switch 46 is controlled by signals from the line switch controller 36 and central office 10.

1. Control by Line Switch Controller 36

The line switch controller 36 communicates with the intra-nodal switch 46 through a plurality of registers under control of commands, with both the register and commands being depicted in FIG. 7. There are nine registers, four of which can be read and written by the line switch controller 36, and five of which can only be read by the line switch controller. Specifically, the line switch controller uses an LGH ASSMT line group highway assignment register to load the storage locations of the LGH RAM 54. A TSI ASSMT time slot interchange assignment register allows the line switch controller to load the contents of the TSI RAM 60. In addition, the TSI ASSMT register contains two stages which control masking of the M1 and M2 mismatch error indications. A PGHI ASSMT register allows the line switch controller to load the PGHI RAM 61 with an internal port group highway number to control PGHI selector 64 and a source identification to control source selector 62, or to idle an internal port group highway for a time slot.

By means of LGH STATUS register, the line switch controller can read the contents of a particular location in the LGH RAM 54. Similarly, the TSI STATUS and PGHI STATUS registers allow the line switch controller to read the contents of storage locations in the TSI and PGHI RAMs 60 and 61.

A command register contains a field for a command. The various commands are presented in the table in FIG. 7. The commands identify the particular registers which are to be read or written. The command register also contains FORCE M1 and FORCE M2 stages which forces the intra-nodal switch to generate an M1 or M2 mismatchsignal, which is then coupled to the line switch controller. The intra-nodal switch 46 loads a DONE stage of the command register when the command has been executed.

More specifically, the line switch controller 36 loads the data to be written into one of the registers in a holding register and an identification of a section of the intra-nodal switch and a time slot number into an address register and writes a command into the command register. The data from the holding register is loaded into the RAM specified by the command in the command register in the section of the switch identified by the address register. In effect, the data is written into the particular storage location in the LGH RAM 54, TSI RAM 60, or PGHI RAM 61 specified by the register, in the section and time slot identified by the address. If the command is a read command, the contents of the specified locations in the RAM are transmitted to the line switch controller.

2. Call Processing

As has been noted, the central office, specifically the call control processor 16, controls intra-nodal switch 46 through the line switch controller 36. This control is enabled by means of messages having the format depicted in FIG. 8A. Each message includes a header field and a data field. The header field includes a data byte count, a receiving device identification which contains the address identifying the intended recipient of the message, and a message type which identifies the nature of the message and essentially indicates the operations to be performed in response to the message. The receiving device uses the data in the data field of the message in performing the operations specified in the message type field. FIGS. 8B through 8F identify the data transmitted in the data field of particular types of messages.

Figure 9A:
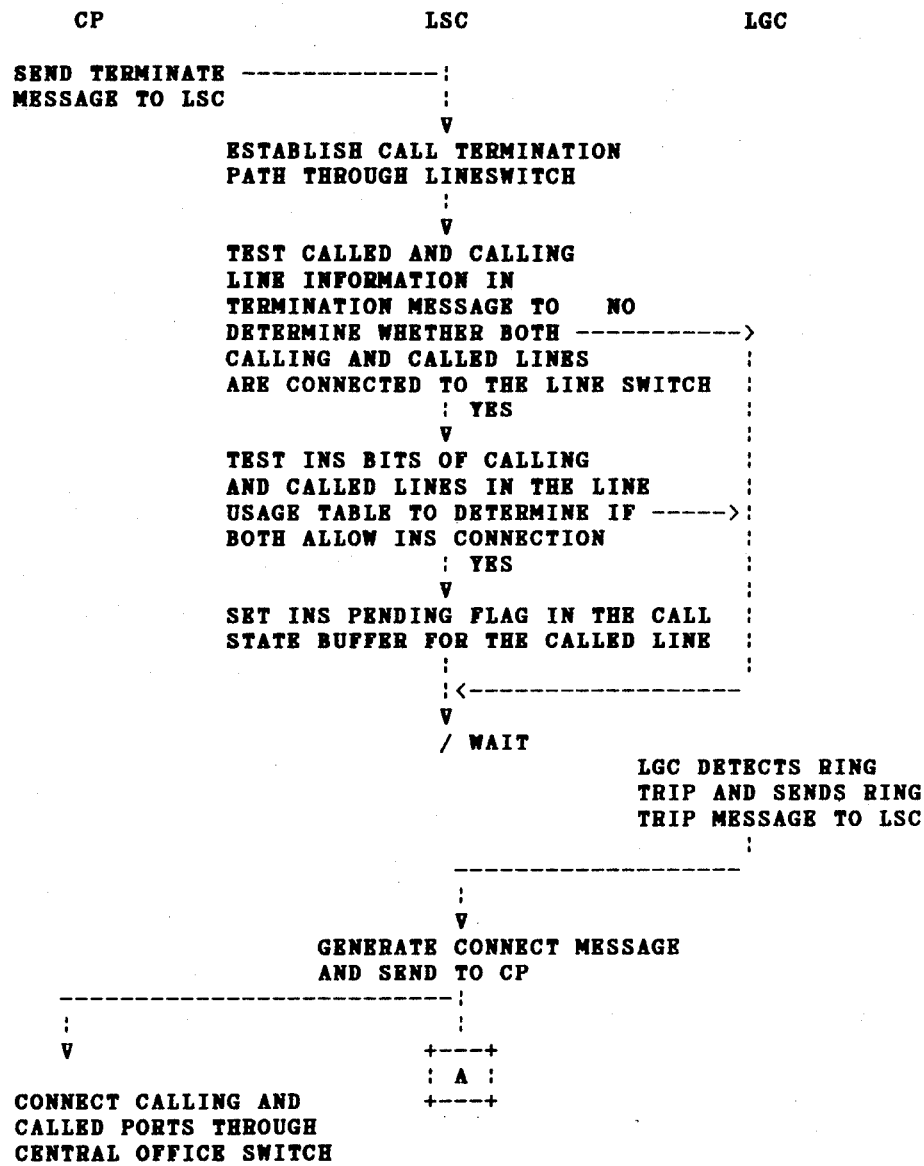
Figure 9B:
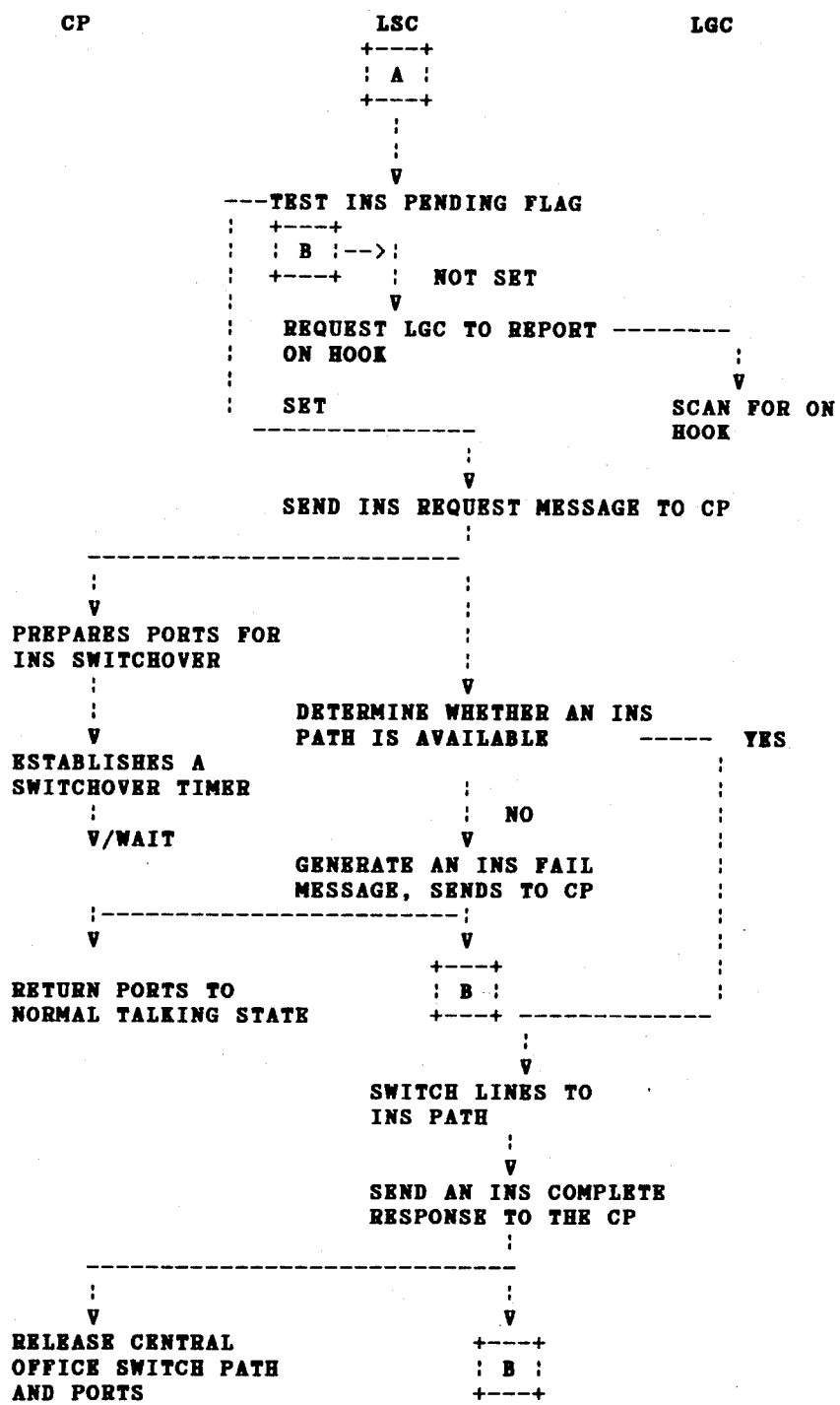

Call processing in a system depicted in FIG. 1 which does not include an intra-nodal switch 46 is described in the aforementioned patent application Ser. No. 427,513. The call processing in a system in which an intra-nodal switch 46 is present differs from call processing in the system described in that application in several ways, including (1) in establishing a connection through the line switch 12 to the called subscriber line, which is depicted in detail in the flow diagram FIG. 9A and B, (2) in the busy verify procedure, wherein the operator at the central office verifies that either the calling line or the called line is busy, which is described in detail in FIGS. 10A and 10B, and (3) in the call release procedure, where one of the calling or called lines goes to an on-hook condition, which is depicted in detail in FIG. 11A-1 through 11C. These operations will be briefly described herein and reference should be made to the figures for the detailed operation. Furthermore, reference should be made to the aforementioned U.S. patent application Ser. No. 427,513, which is incorporated herein by reference, for the call processing and set-up procedures for a line switch without an intra-nodal switch 46.

Preliminarily, the line switch controller 36 uses two data structures which relate to intra-nodal switching. A line usage table, provided by the call control processor in a download fashion at system initialization or when classes of service are changed, stores certain information about each subscriber line connected to the line switch 12, including whether or not the line's class of service permits intra-nodal calls. If a subscriber line's class of service is such that the subscriber has certain features, such as features initiated by hook flash, malicious call monitoring or the like, one specific embodiment of the invention requires central office monitoring to enable the features to be implemented. The line usage table indicates that the call should not be switched through an intra-nodal switch. An INS bit in the line usage table is either set or cleared to indicate whether the line qualifies for intra-nodal switching.

The line switch controller 36 also implements a call buffer for every calling or called line connected to the line switch. When a line goes off-hook, or when a message is received from the central office 10 requesting a termination connection to a called line, the line switch controller sets up a call buffer in its resident memory. The call buffer includes data fields which the line switch controller uses to monitor the status of the call, one of the data fields being whether the call qualifies for switching through intra-nodal switch 46.

(i) Intra-nodal Call Set-up

As explained in the aforementioned application Ser. No. 427,513, after the origination path from the calling telephone to the central office is set up, the call processor 16 (FIG. 1) sends a terminate message (FIGS. 8A and 8C) to the the line switch controller of the line switch connected to the called subscriber line. The line switch controller then establishes a path through line group highway switch 38 and, through the line group controller 32, line group multiplexer 34 between the line card 30 of the called subscriber line and one of the port group highways 42.

Figure 8A:
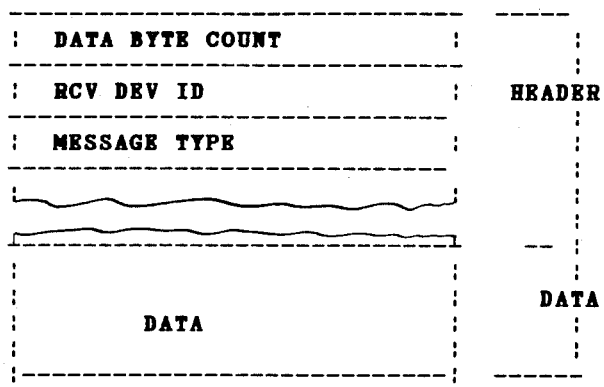
Figure 8B:
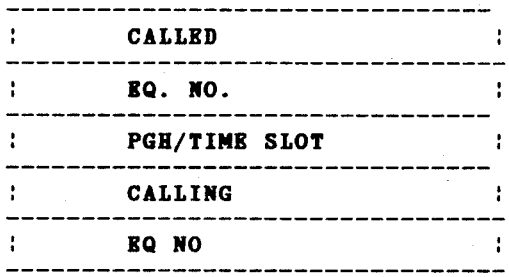
Figure 8C:
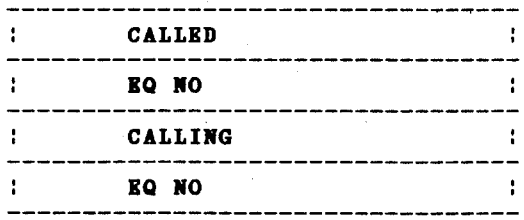

As shown in FIG. 8C, the terminate message includes the equipment numbers of both calling and called subscriber lines. Using these equipment numbers, the line switch controller 36 can determine whether or not the subscriber lines are both attached to the line switch 12. If they are, the line switch controller 36 examines the contents of the line usage table for the two lines and determines whether both lines can qualify for intra-nodal switching. If the call does qualify for intra-nodal switching, the controller 36 sets an INS PENDING flag in the call buffer for the called line and then waits for the line group controller 32 of the line group to which the called subscriber line is connected to detect when the called subscriber line goes off hook.

When the called line goes off hook, the line switch controller 36 generates a connect message (FIGS. 8A and 8B) and sends it to call processor 16. With reference to FIG. 8B, the connect message identifies the calling and called subscriber lines and the port group highway and time slot assigned to the called line. The call processor 16 then establishes a path through the switch 18 between the calling and called subscriber lines.

After transmitting the connect message, the line switch controller 36 tests the INS PENDING flag in the called line's call buffer. If it is not set, the call will not be switched through intra-nodal switch 46, and so the line switch controller 36 requests the line group controllers 32 of the calling and called subscriber lines to report when either goes on hook.

If, on the other hand, the INS PENDING flag is set, the call qualifies for intra-nodal switching, and the line switch controller sends an INS REQUEST message (FIGS. 8A and 8C) to the call processor. Call processor 16 then prepares the ports for switch-over of the responsibility of the call to the line switch, establishes a switch-over timer, and waits.

After sending the INS REQUEST message, the line switch controller then determines whether a path through the intra-nodal switch is available. This procedure is similar to the procedure used by the line switch controller to determine whether a path is available through line group highway switch 38, which is described in the aforementioned application Ser. No. 427,513, and will not be repeated herein. If no path is available through the intra-nodal switch, the line switch controller sends an INS FAIL message (FIGS. 8A and 8D) to the call processor 16, which returns the ports to the normal talking state.

If the line switch controller 36 determines that an intra-nodal switch path is available, it establishes the path by loading the appropriate data into locations in the LGH, TSI and PGHI RAMS to switch the call through the intra-nodal switch 46. It then sends an INS COMPLETE message (FIGS. 8A and 8C) to the call processor, which releases the path through switch 18. The line switch controller 36 then requests the line group controllers 30 of the line groups 26 to which the calling and called subscriber lines are connected to report when either goes on hook.

(ii.) Busy Verify

In the busy verify sequence (FIGS. 10A and 10B), the line switch controller 36 returns the call switching from the intra-nodal switch 46 to central office switch 18. The line switch controller effectively establishes separate path through the line switch from the calling and called subscriber lines to the port group highways 42 while the intra-nodal switch is switching the call. When the path is set up through the central office switch, the line switch can release the path through the intra-nodal switch.

Figure 10A:
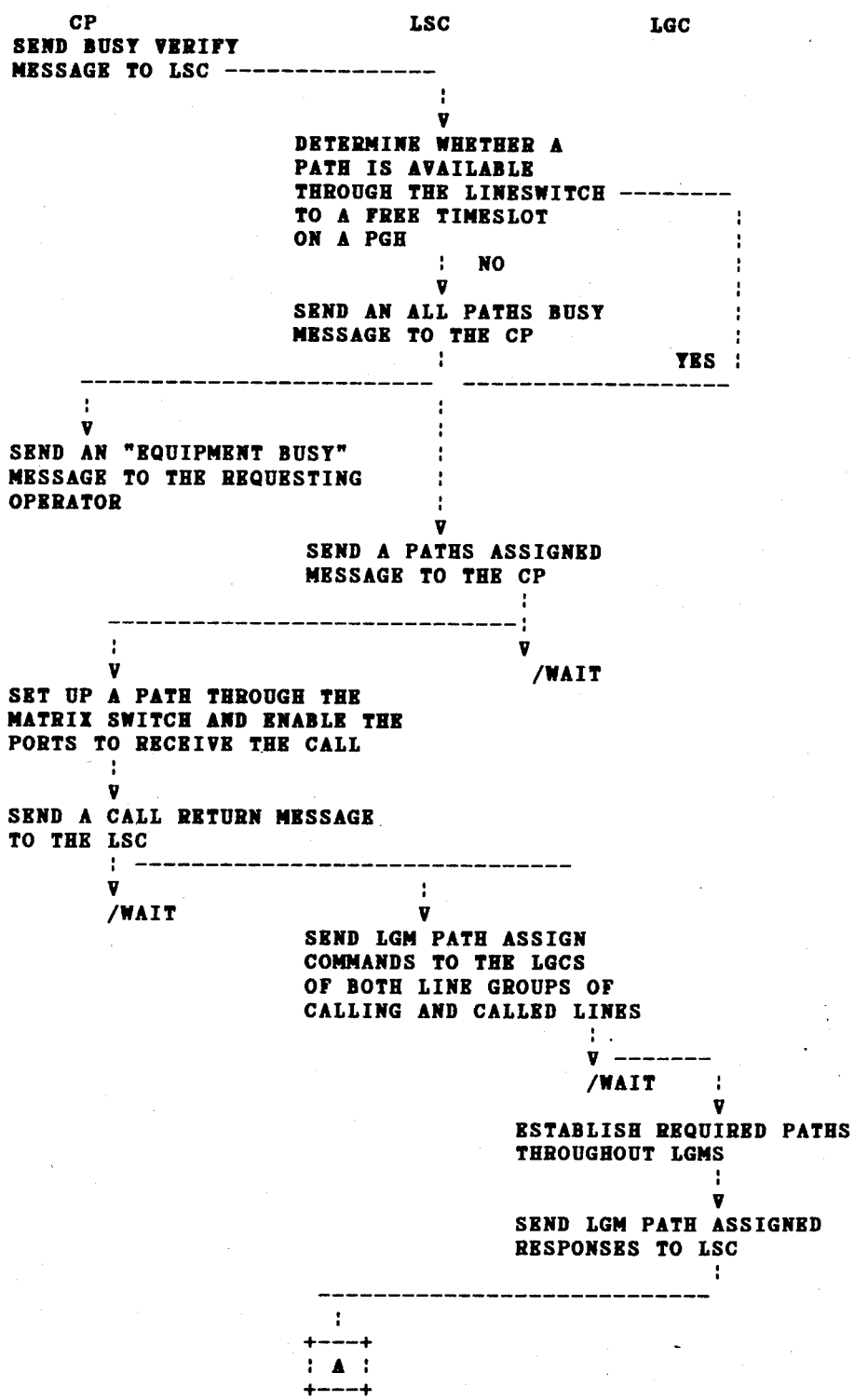
Figure 10B:
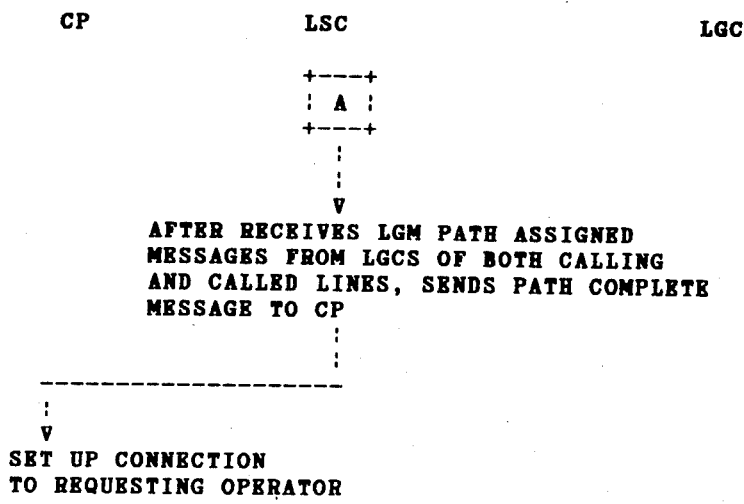
Figures 2, 11A:
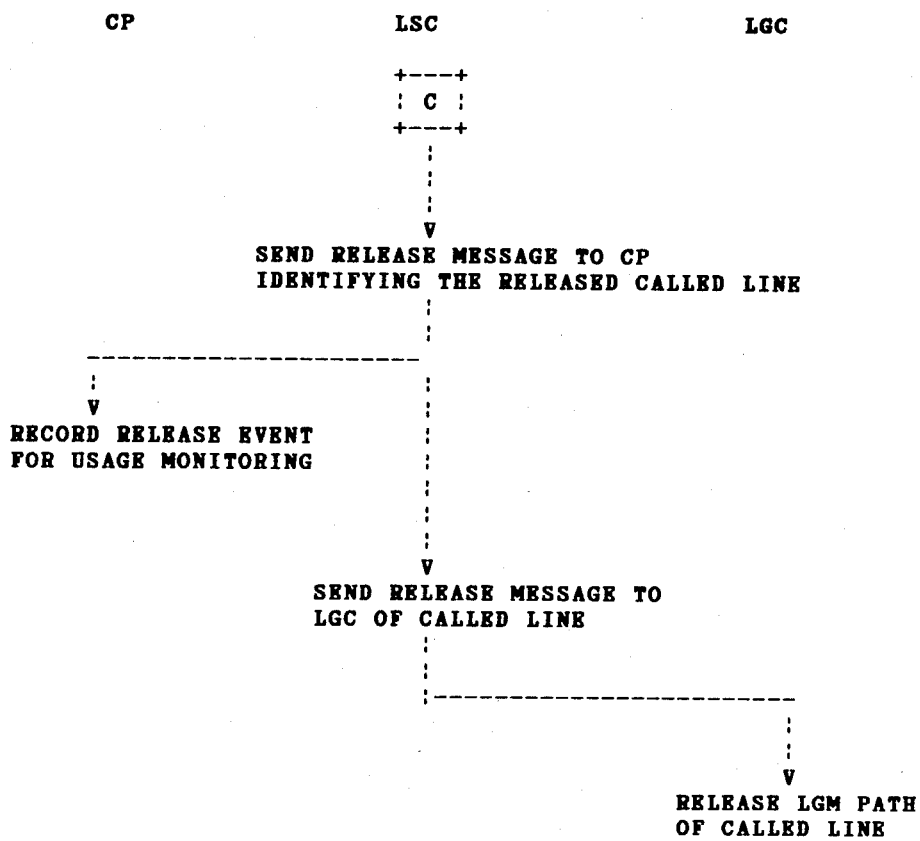
Figures 2, 11B:
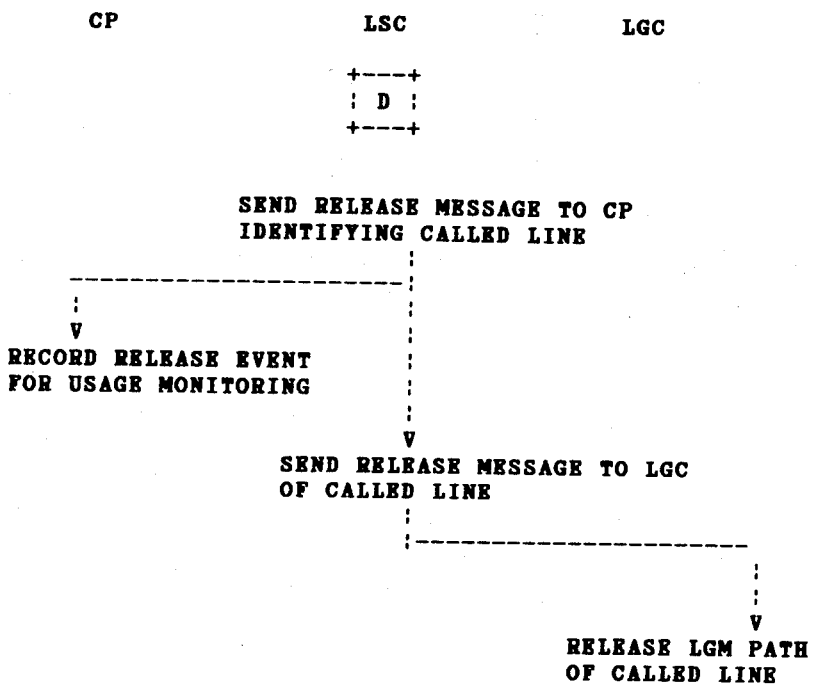
Figure 11C:
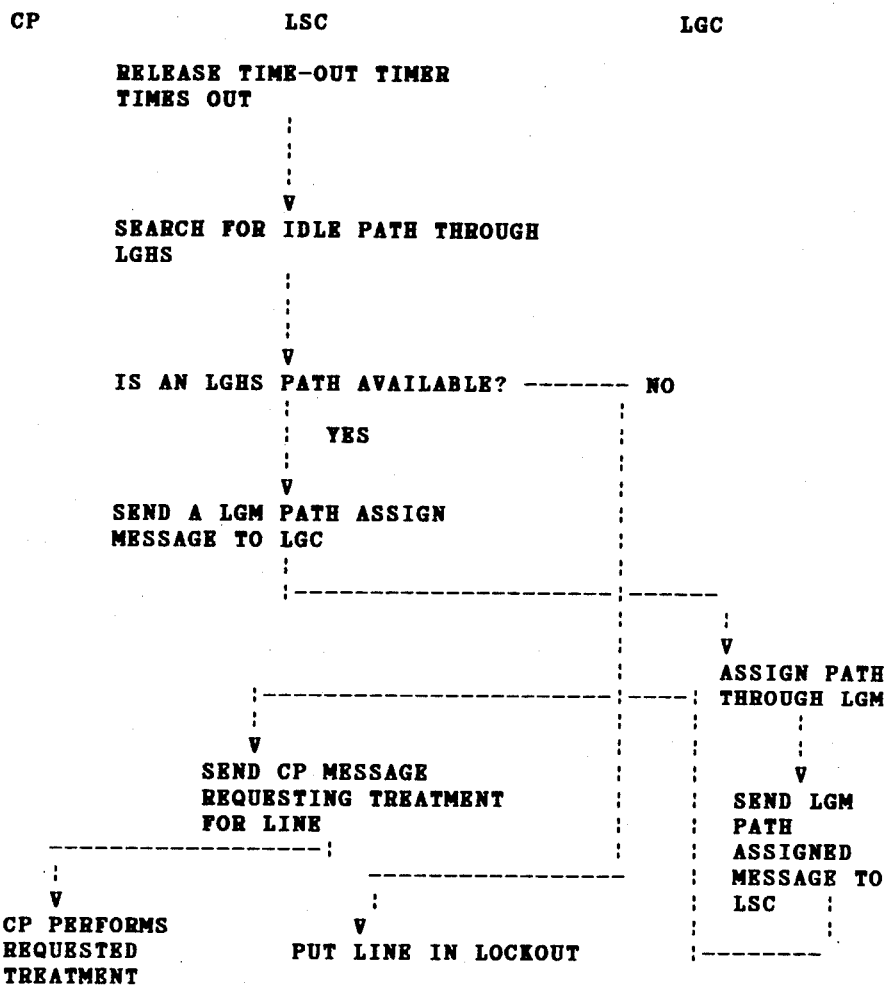

To initiate the busy verify process the call processor 16 sends to the line switch controller 36 a BUSY VERIFY message (FIGS. 8A and 8C) identifying the called and the calling subscriber lines. With reference to FIGS. 10A and 10B, the line switch controller determines whether paths are available through the line switch to idle time slots on the port group highways 42 for each of the calling and called subscriber lines. The procedure by which it performs these operations is described in U.S. patent applications Ser. No. 427,513. If paths are not available, the line switch controller sends an ALL PATHS BUSY message to the call processor (FIGS. 8A and 8E).

If paths are available to the port group highways 42, the line switch controller 36 sends a PATHS ASSIGNED message to the call processor 16, identifying the port group highways and the time slots which carry the call. The call control processor 16 then establishes a path through the switch 18 to switch the call and sends a CALL RETURN message to the line switch controller causing it to establish the path through the line switch 12 and eliminate the intra-nodal switch path 40.

The line switch controller then sends messages to the line group controllers 32 enabling it to establish the required path through the line group multiplexers for both the calling and called lines and then informs the call processor that the path is completed. The call control processor 16 then sets up a connection to the requesting operator enabling the operator to perform the required operations.

(iii) Intra-nodal Call Release

The operations performed by the line switch controller during a call release for a call through the intra-nodal switch depend on whether the calling or called subscriber first goes on-hook. The procedures in both cases are similar. If the calling subscriber first goes on hook, the operations are described in FIGS. 11A-1 and 11A-2. If the called subscriber goes on hook, the operations are as described in 11B-1 and 11B-2. If one subscriber goes on hook, and the other does not go on hook within a selected time period, the system performs a lock out operation as described in FIG. 11C. When either subscriber goes on hook, the line switch controller releases the path through the line switch, and informs the call processor of the release event so that the call processor can perform any call usage monitoring activity it may perform.

3. Emergency Switching

As has been mentioned, a line switch 12 which includes an intra-nodal switch 46 can also perform emergency switching in the event that communication links between the line switch and the central office 10 are broken. During normal call operation, the dialed digits are detected by the central office 10; however, during emergency switching, the digits decoder 70 (FIG. 2) in the intra-nodal switch performs the digits decoding. The line switch controller then sets up the path through the intra-nodal switch as described above. As is evident, for emergency switching to take place, the calling and called subscriber lines must be attached to the same line switch 12.

The foregoing description is limited to a specific embodiment of this invention. It will be apparent, however, that this invention can be practiced in systems that have diverse basic construction or in systems that have different internal circuitry than is described in the specification with the attainment of some or all of the foregoing advantages of this invention. Therefore, it is the object of the appended claims to cover all such variations and modifications as come within the true spirit and scope of this invention.

What is claimed as new and desired to be secured by Letters Patent of the United States is:

1. A telephony network comprising a plurality of subscriber lines connected to a line switch which is in turn connected to a central office over a plurality of port group highways,
   A. said line switch comprising:
      (i) line card means connected to each subscriber line for converting the voice signals between analog and digital form,
      (ii) line group highway means connected to said line card means for transferring digital voice signals to and from said line card means,
      (iii) line group highway switch means connected to said line card means and said line group highway means for transferring digital voice signals between said line group highway means and said port group highway means, and
      (iv) control means connected to said line card means and said line group highway switch means for establishing paths through said line switch to couple digital voice signals between said line card means and said port group highway means in response to messages from said central office,
   B. said central office comprising:
      (i) switching means connected to said port group highways for switching digital voice signals among said port group highways, and
      (ii) message generating means for generating messages for transmission to said line switch control means to control said line switch control means to provide communications between line switch means to switch telephone calls between calling and called subscriber lines,
   C. said line switch further comprising:
      (i) intra-nodal switching means connected to said line switch control means and to line group highway means for switching, under control of said line switch control means, digital voice signals between line group highway means to enable calls between subscriber lines connected to the line switch to be switched at the line switch rather than by the central office switching means,
      (ii) said line switch control means further comprising:
         a. line usage table means containing an entry for each subscriber line indicating whether a call involving that line can be switched through said intra-nodal switching means;
         b. means responsive to the receipt of a message from said central office initiating a termination connection through said line switch for determining whether both subscriber lines involved with the call are connected to the line switch and for testing the line usage table means for the subscriber lines to determine whether the lines can be switched through said intra-nodal switching means, and
         c. means for establishing a path through said intra-nodal switching means if both subscriber lines involved with the call are connected to said line switch and if calls to both subscriber lines can be switched through said intra-nodal switching means.

2. A telephony network as defined in claim 1 wherein said line switch control means further includes a message generating means including means for transmitting to said central office an intra-nodal switch request message if both lines involved with a call are connected to said line switch and if said line usage table indicates that calls involving both lines can be switched through said intra-nodal switch, said central office including central office control means for receiving said intra-nodal switch request message and in response thereto establishing a condition whereby it will thereafter abolish the path through said central office switch means established for the call.

3. A telephony network as defined in claim 2 wherein said path establishing means further includes means for determining whether a path can be established through said intra-nodal switch means to switch a call, said line switch message generating means further including means for transmitting to said central office an intra-nodal switch fail message if a path cannot be established, said central office control means removing the switch path abolishing condition so that the call will be switched through said central office switch means.

4. A telephony network defined in claim 3 wherein said line switch message generating means further includes means for transmitting to said central office an intra-nodal complete message if a path through said intra-nodal switch is established, said central office control means including means for receiving the intra-nodal complete message to abolish the path for the call through said central office switch in response to the receipt of the intra-nodal complete message.

5. A telephony network as defined in claim 1 wherein said intra-nodal switching means switches digital voice signals between selected ones of a plurality of line group highway means, said intra-nodal switching means comprising:

A. timing means for iteratively transmitting a series of timing signals each of which identifies one of a series of time slots;

B. line group highway selector means connected to said line group highway means and to said timing means for coupling digital voice signals from and to one of said line group highway means during each time slot;

C. voice memory means connected to said line group highway selector means and said timing means, said voice memory means including a plurality of storage locations each associated with one of the time slots, during each time slot said voice memory means storing the digital voice signals in the storage location associated with that time slot and transmitting digital voice signals from another storage location to achieve a switching operation, said line group highway selector means coupling the digital voice signal transmitted by said voice memory means to a selected one of said line group highway means.

6. A telephony network as defined in claim 5 wherein said voice memory means further comprises address storage means connected to said timing means and having a plurality of storage locations each associated with one of said time slots, said address storage means during each time slot transmitting an address to identify the storage location from which digital voice signals are transmitted.

7. A telephony network as defined in claim 5 wherein said line group highway selector means comprises:

A. input multiplexer means connected to said line group highway means and a digital voice signal input terminal of said voice memory means for coupling digital voice signals from selected ones of said line group highway means to the voice memory means;

B. output multiplexer means connected to said line group highway means and an output terminal of said voice memory means for coupling digital voice signals from said output terminal to selected ones of said line group highway means; and C. line group highway memory means connected to said timing means, and said input and output multiplexer means and comprising a plurality of storage locations each associated with a time slot for storing the identification of a line group highway and using the stored identifications to control the operation of said input and output multiplexers during each time slot.

8. A telephony network as defined in claim 7 wherein said line switch further includes means for generating tone signals, said intra-nodal switching means further including digital signals selection means connected to said output terminal of said voice memory means and the input of said output multiplexer means for selectively coupling, during each time slot, either the digital voice signals from said voice memory means or the tone signals to the input of said output multiplexer means.

9. A telephony network as defined in claim 7 further including function memory means connected to said timing means and to said digital signals selection means and including a plurality of storage locations each associated with one of said time slots, the contents of the storage locations controlling said digital signals selection means during each time slot.

10. A telephony network as defined in claim 7 wherein said line switch further includes a plurality of output multiplexer means the input of each being connected to an internal port group highway means, and an internal port group highway selection means connected to said timing means and to the output of said voice memory means for coupling the digital voice signals to selected ones of said internal port group highway means during each time slot.

11. A telephony network as defined in claim 10 wherein said internal port group highway selection means comprises selector means connected to the output of said voice memory means and the input of said output multiplexer means for selectively coupling the digital voice signals between said voice memory means and said output multiplexer means, and control means including internal port group highway memory means connected to said timing means and including a plurality of storage locations each associated with a time slot, the contents of said storage locations of said internal port group highway memory means controlling said selector means during each time slot.

12. A telephony network as defined in claim 5 further comprising dialing decoder means connected to the output of said line group highway selector means for receiving digital voice signals therefrom in response to control signals from said line group highway selector means when said digital voice signals comprise digits and for decoding them to identify the digits.

* * * * *